United States Patent [19]

Guidot et al.

[11] Patent Number: 5,926,835
[45] Date of Patent: Jul. 20, 1999

[54] METHOD OF ISOLATING A MEMORY LOCATION CONTAINING AN OBSOLETE VALUE

[75] Inventors: Dominique Guidot, Sevres; Franck Jouenne, Le Plessis Trevise; Benoit Paul Dubois Taine, Bourg la Reine, all of France

[73] Assignee: Alcatel Alsthom Compagnie Generale D'Electricite, Paris, France

[21] Appl. No.: 08/878,768

[22] Filed: Jun. 19, 1997

[30] Foreign Application Priority Data

Jun. 19, 1997 [FR] France .................................. 97 07636

[51] Int. Cl.$^6$ ...................................... G06F 12/14
[52] U.S. Cl. ............................................... 711/152
[58] Field of Search ................................ 711/147, 150, 711/151, 152, 163; 707/206

[56] References Cited

U.S. PATENT DOCUMENTS 5,218,698  6/1993  Mandl .
5,263,155  11/1993  Wang .......................................... 707/8

FOREIGN PATENT DOCUMENTS 0 713 179 A1  5/1996  European Pat. Off. .

OTHER PUBLICATIONS

N. Shavit et al Software Transactional Memory, Proceedings of Fourteenth ACM SIGACT–SIGOPS, Ottawa, Ontario, Canada, Aug. 20, 1995, pp. 204–213.

*Primary Examiner*—Eddie P. Chan
*Assistant Examiner*—Kevin L. Ellis
*Attorney, Agent, or Firm*—Sughrue, Mion, Zinn, Macpeak & Seas, PLLC

[57] ABSTRACT

A method of isolating a memory location containing an obsolete value of a variable, in a shared memory of a computer, said location being referenced via a pointer for access in the context of a first transaction, a lock called a "hold" being placed on said location and being assigned to a single task, said hold preventing any other task from accessing said location. The method of the invention does not free the location containing the obsolete value, but it isolates it from transactions other than that transaction which possesses the first pointer. This allows the task owning the first pointer to continue to access said obsolete value. However, any transaction can access another value of the variable, without waiting, because the descriptor of said variable directs said transactions to a location which is freely accessible and contains said other value.

1 Claim, 3 Drawing Sheets

METHOD OF ISOLATING A MEMORY LOCATION CONTAINING AN OBSOLETE VALUE

BACKGROUND OF THE INVENTION

The invention relates to a method of isolating a memory location containing an obsolete value, using a data administrator managing a shared "transaction" memory, and allowing access to the data via pointers, said method being applicable to any real time and/or on-board application. Such a memory is the central memory of a computer in which a plurality of processes are executed simultaneously. Each process is itself generally constituted by a plurality of elementary tasks which may be in competition with one another for accessing the data in order to read and modify it. The memory is structured as fixed-size elements which are referred to below as "memory locations".

A computer has a central memory of limited capacity, but in which all the locations are accessed directly, and therefore very fast, and mass storage generally constituted by a hard disk, having a much larger capacity but much slower access time since it is necessary to select a track then wait for the desired location on a track to present itself to a read head. Conventionally, the computer operating system loads only the data which is actually required at a given instant into the central memory, and loading is performed by means of a small, fast, specialized memory which is called a "cache" memory and which provides a noticeable increase in speed of access to the hard disk by an anticipation mechanism which makes use of the fact that applications generally use data sequentially. Conventional data administrators have therefore been optimized on the assumption that data passes via a cache memory.

The progress of semi-conductor memory technology now enables a central memory to be made that has sufficient capacity to load into central memory all of the data shared by all of the processes being executed in a computer, even for applications that manipulate large volumes of data. Thus, the role of the hard disk is merely to safeguard data by keeping an up-to-date copy of all the data which is in central memory. Loading all of the data into central memory is particularly advantageous for applications which do not make use of data sequentially, cache memory being only of limited benefit to such applications. This is particularly the case for applications controlling telecommunications exchanges.

Data administrators for object-oriented databases, and data administrators for relational databases are known.

There are two types of data access: read access or write access. For each access type, two methods of data transfer between the data administrator and an elementary task are known: a value transfer method, and a pointer transfer method.

For read (or write) access to the value of a variable, the value transfer method consists in reading (or writing) a value of the variable in the memory location which contains the current value of the variable; while the pointer transfer method consists in providing the task which has requested a read (or a write) with an address, called a "pointer", which designates the memory location where the value to be read is situated (or the location where a value is to be written), with the task then being free to read (or write) in said location for as long as it has said pointer. When a task accesses a variable using the pointer method, it assigns a lock called a "hold" to the memory location which contains the current value of said variable, for said task. Said hold prevents any other task from accessing said location so as to maintain consistency of the data seen by each task. The task which possesses a hold on a memory location containing a value of a variable can access said location as often as it likes, and for as long as it decides not to release said hold.

The pointer transfer method is known in object-oriented data administrators. It has the advantage of allowing fast access. It allows data to be manipulated like a programming language variable. However, object-oriented data administrators have a drawback: either they do not offer multitasking transactions (consequently there is no competition), or they do not offer object-locking (any competition causes a page to lock and results in the entire page being copied into a journal. This level of granularity therefore leads to additional cost).

The value transfer method can be used in applications without managing access competition. Access competition is managed mainly by means of read or write locks which are assigned by the database data administrator.

A set of read and/or write operations, directed towards a plurality of variables, requested by a task in a single request is called a "transaction". In a transaction each operation can be made either by the value transfer method, or by the pointer transfer method. All transactions are made up of three phases:

an opening phase, during which the data administrator provides a unique transaction identifier for the task which has opened the transaction, said identifier designating a memory location containing a transaction descriptor;

an access phase, during which read or write operations are executed by the task that has opened the transaction, but which cannot be seen by users not involved in said transaction; and during which rights called "read locks" and "write locks" are assigned to said transaction for the memory location under consideration. In a known access method, when a transaction performs a write access, it provisionally records the new value of the variable in a memory location called a "journal" which is assigned to said transaction for said variable. Said journal can be accessed only by said transaction; and a closing or validation phase, during which the writes and reads are validated. In the above-mentioned known method, the new values (which are contained in the journals assigned to said transaction) are recorded in the respective locations containing the current values, and they can then be seen by all tasks. The read values are indeed read. The journals, locks, and holds assigned to said transaction are released.

However, it is possible for a transaction to be aborted either at the request of the task that requested opening of said transaction, or because of conflict with another transaction, or because of a discrepancy in a request constituting said transaction.

A lock can be assigned to the memory location containing the current value or the new value of a variable which is the subject of a transaction, in order to prevent other operations which would compromise data consistency. A lock can be assigned to the entire data table.

Certain transaction protocols allow a transaction to be performed while guaranteeing four properties, called "ACID":

atomism (either all accesses requested by a transaction are processed, or else none are);

consistency (all data passes from one stable state to another stable state);

isolation (new values of the variables are not seen from outside the transaction, until the transaction has closed);

durability (as soon as a transaction is validated, the new values of the variables withstand failure of the station on which they are stored; said values being safeguarded on a disk or on another station which is in operation); and serialization (if a plurality of transactions take place in parallel, the result thereof is the same as if they took place successively).

Patent application FR 2 727 222 describes such a transaction protocol. Known data administrators guarantee ACID properties but they have the drawback of not offering pointer access which would allow faster access. They are therefore not completely satisfactory.

In the context of a system where all the data is loaded into a central semi-conductor memory, it is possible to perform accesses via pointers, within a transaction or outside a transaction, but the use of pointers, and therefore of holds, creates a drawback: When a first transaction is aborted, a hold can remain assigned to a memory location while the value contained in said location has become obsolete. Said value is obsolete because said location is the journal containing the current value of a variable, or the new value that said first transaction was going to give to said variable.

Said hold continues to prevent access to said location, and therefore continues to prevent access to said variable, because said memory location remains assigned to said variable for storing its current value or its new value as the case may be. Said variable therefore remains unnecessarily inaccessible, until the application which possesses said hold decides to release it. During this time, one or more other transactions may be waiting to access said variable. Such unnecessary waiting slows down the overall performance of the system.

SUMMARY OF THE INVENTION

The object of the invention is to remedy that drawback.

The invention provides a method of isolating a memory location in a shared memory of a computer and containing an obsolete value of a variable, said location being referenced for access via a pointer in the context of a first transaction, a lock called a "hold" being placed on said location and being assigned to a single task, said hold preventing any other task from accessing said location; said method being characterized in that:

if said first transaction is an aborted transaction, and:
  if the obsolete value is a new value of said variable, then the method consists in erasing, from the descriptor of said variable, both the identity of the aborted transaction and the address of said location, and in writing said address in the descriptor of said transaction, and then in releasing said hold;
  if the obsolete value was previously the current value of said variable, then the method consists in erasing, from the descriptor of said variable, both the identity of the aborted transaction and the address of said location, and in writing said address in the descriptor of said transaction, then in releasing the hold assigned to the pointer, and then in assigning a free memory location to the current value, in writing said current value in said location, and in writing the address of said location in the descriptor of said variable;
  if said first transaction is a transaction aborted because of a second transaction which needs to access said variable in order to write a new value, and which validates said access, and if the obsolete value was previously the current value of the variable, then the method consists in exchanging, in the descriptor of said variable, the addresses of the locations which respectively contain the obsolete current value (Vcou) and the new value, and in placing a hold on the location containing the obsolete value, in order to prevent the obsolete value being modified, in erasing the identity of the second transaction, and then in releasing the hold assigned to the pointer for said new value, if there is one.

The method thus characterized does not free the location containing the obsolete value, but isolates it from transactions other than that transaction which possesses the first pointer. This allows the task owning the first pointer to continue to access said obsolete value. However, any transaction can access another value of the variable, without waiting, since the descriptor of said variable sends said transactions to a location which is freely accessible and contains said other value.

BRIEF DESCRIPTION OF THE DRAWINGS

The invention will be better understood and other characteristics will appear from the following description of an implementation, and from the accompanying figures.

DETAILED DESCRIPTION OF THE INVENTION

In the invention, a data administrator assigns a variable descriptor to each variable, which descriptor contains the following information which is used by said data administrator:

the identity TR of the transaction that has requested read access to said variable, if said access request is made in the context of a transaction;

the address ADvc of a memory location containing the current value of said variable:

a binary flag Hvc indicating whether or not a hold has been assigned to a pointer referencing the location containing the current value of said variable;

the address ADvn of a memory location containing the new value intended to replace the current value of said variable; and a binary flag Hvn indicating whether a hold has been assigned for the location of the new value of said variable.

The data administrator assigns a transaction descriptor to each transaction, which descriptor contains the following information which is used by the data administrator:

the identity IT of said transaction;

the descriptor addresses ADV of the variables which are read accessed by said transaction; and the addresses AVO of the locations containing the respective obsolete values of the variables which are read accessed by said transaction.

Figure 1A:
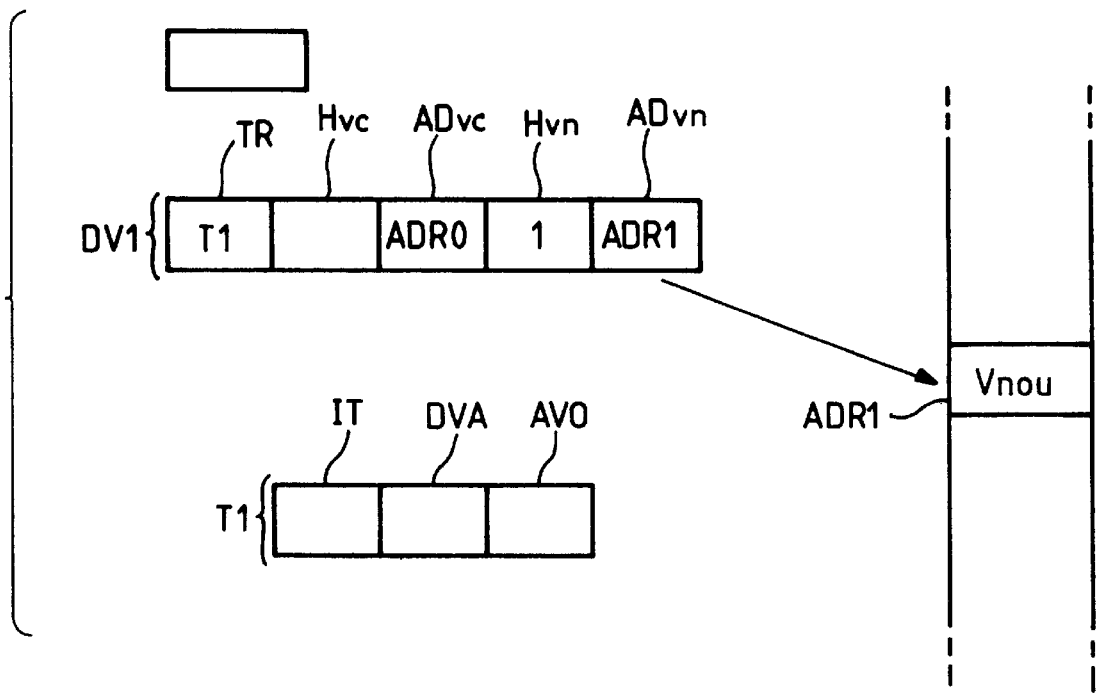
FIGS. 1A to 3B respectively showing the three cases which can occur.
Figure 1B:
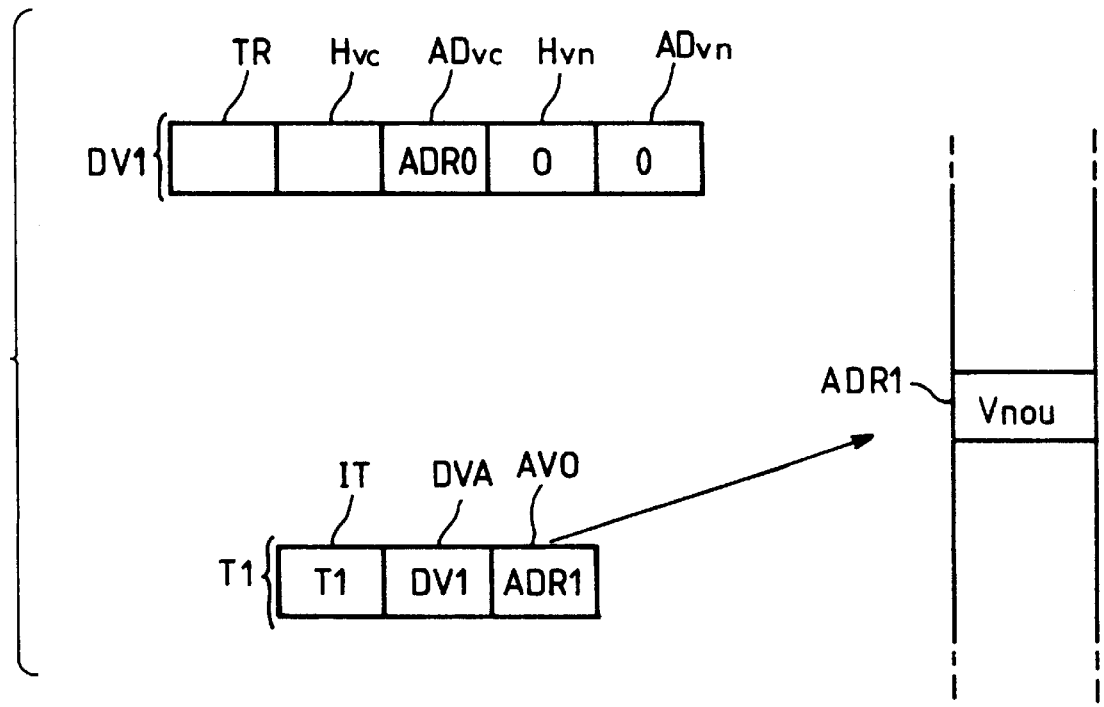

FIGS. 1A and 1B show the application of the method of the invention in the event where a transaction T1 has aborted, and where a pointer, assigned to said transaction T1, references the location ADR1 of a value Vnou which is the new value of a variable V1. The descriptor DV1 of the variable V1 contains: the identity T1 of said transaction, the address ADR1 of the location containing said new value, the address ADR0 of the location (not shown) containing the current value of said variable, and a flag Hvn=1 indicating that a hold has been assigned to said transaction T1. Said hold prevents the new value Vnou of said variable from being read of modified, except by the transaction T1 possessing said hold.

The value Vnou is obsolete since transaction T1 has been aborted. In the descriptor V1 of said variable, the data administrator erases the identity T1 of the aborted transaction and the address ADR1 of said location. It writes said address ADR1 in the descriptor T1 of said transaction. Then it releases the hold by resetting to zero the value of the flag Hvn in the descriptor DV1 of the variable. Thereafter, other users can access said variable and give it any new value, while transaction T1 can continue to access its own new value, for as long as it takes for it to realize that it has been aborted.

Figure 2A:
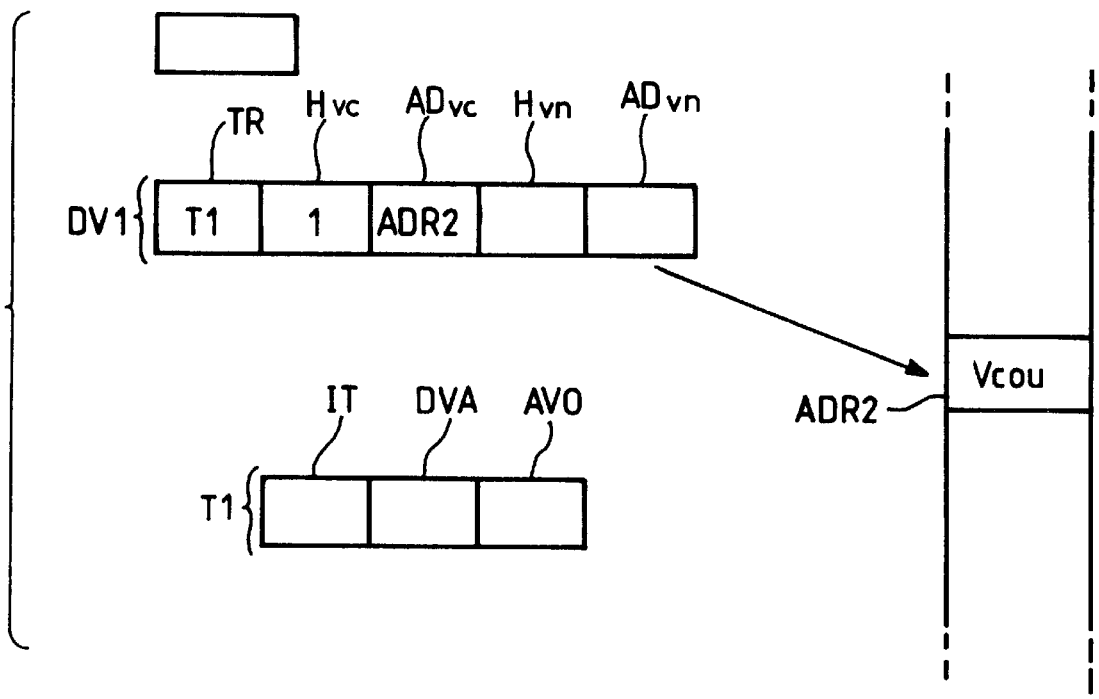
Figure 2B:
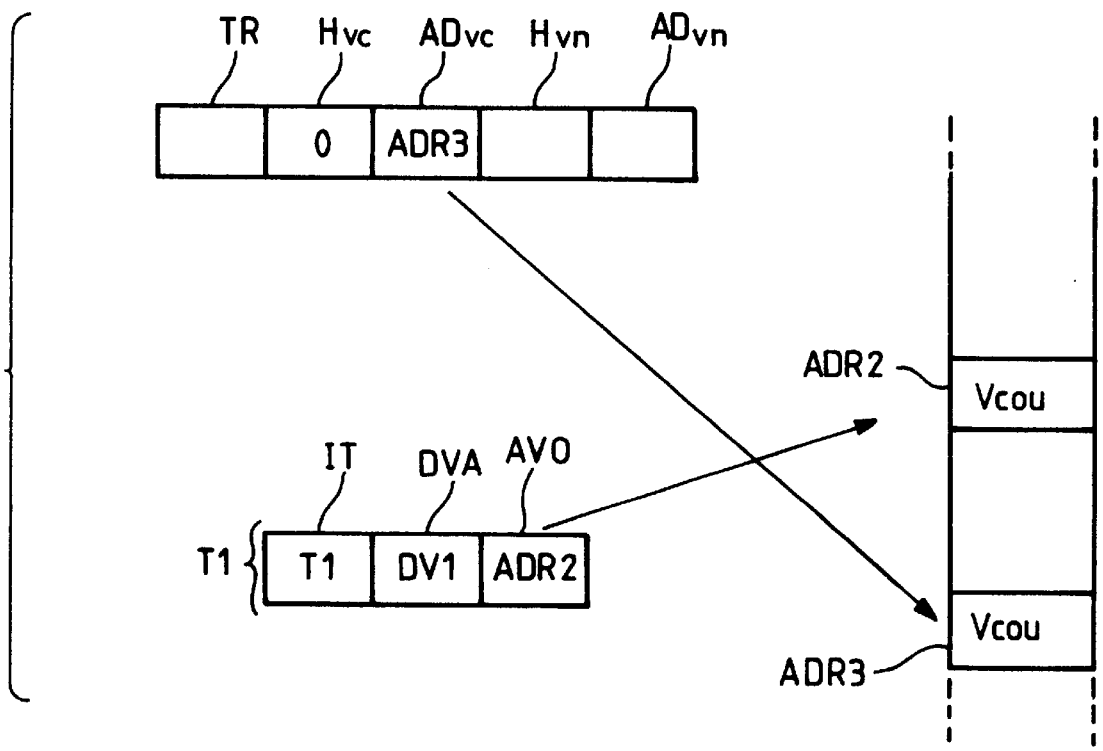

FIGS. 2A and 2B show the application of the method of the invention in the event where a transaction T1 has aborted, and where a pointer assigned to said transaction T1 references the location ADR2 of a value Vcou which is the current value of a variable V1. In the descriptor DV1 of the variable, the data administrator erases the identity T1 of the aborted transaction and the address ADR2 of said location. It writes said address ADR2 in the descriptor of the transaction T1, and then releases the hold assigned to the pointer by resetting to zero the value of the flag Hvc in the descriptor DV1 of the variable. Then it assigns a free memory location to the current value, by giving a value ADR3 to the address ADvc of the memory location containing the current value of said variable, in the descriptor DV1 of said variable. Thus, the current value Vcou becomes accessible to all the users, since they are free to access address ADR3, while transaction T1 can continue to access the current value, for as long as it takes for it explicitly to remove its hold because it has finished hold processing or because it realizes that it has been aborted.

Figure 3A:
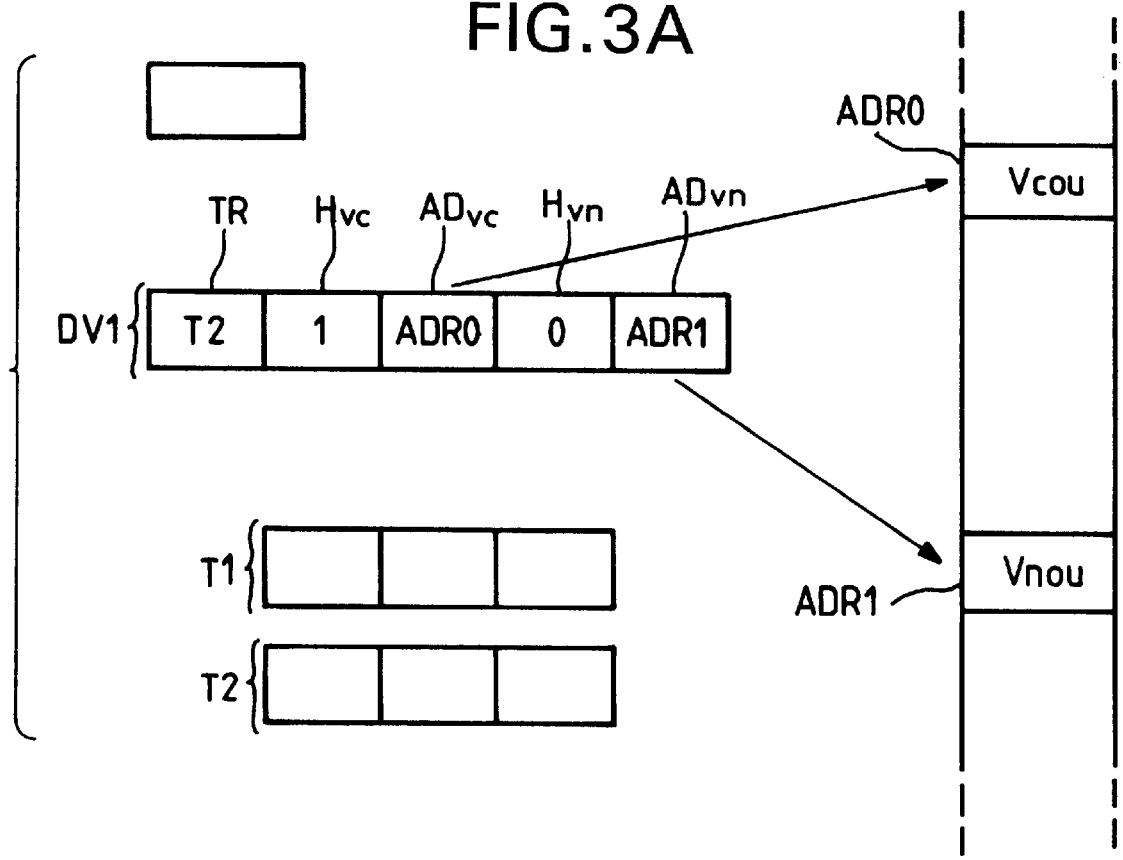
Figure 3B:
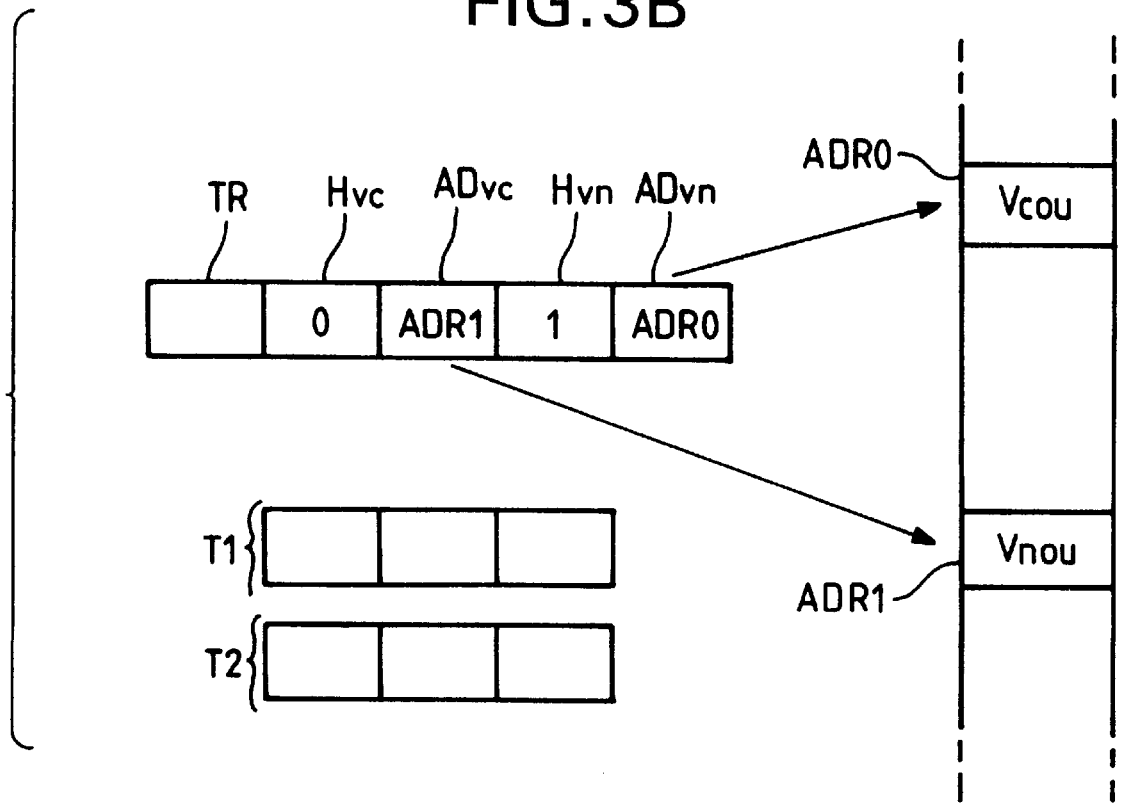

FIGS. 3A and 3B show the application of the method of the invention in the event where a first transaction T1 is an aborted transaction because of a second transaction T2 which requests access to the variable under consideration in order to write a new value Vnou, and which validates said access. The current value Vcou of the variable has therefore become obsolete. The data administrator exchanges the addresses ADR0 and ADR1 of the locations which respectively contain the obsolete current value Vcou and the new value Vnou, in the descriptor DV1 of said variable; and it places a hold on the location ADR0 containing the current value Vcou, by giving the value one to the flag Hvn in the descriptor DV1 of the variable, in order to prevent the obsolete value from being modified. Then it releases the hold assigned to the pointer for the location intended to contain the current value, and which contains thereafter said new value Vnou, by giving the value one to the flag Hvc.

Furthermore, in said descriptor DV1, it erases the identity T2 of the second transaction. Thus, all users can access the new current value Vnou, in the location ADR1. Descriptors T1 and T2 of the transactions are unchanged. Processing the abortion of T1 is similar to that described with reference to FIG. 1.

What is claimed is:

1. A method of isolating a memory location (AD1) in a shared memory of a computer and containing an obsolete value of a variable, said memory location being referenced for access via a pointer in the context of a first transaction (T1), a lock (H=1) called a "hold" being placed on said memory location and being assigned to a single task, said hold preventing any other task from accessing said location; said method being characterized in that:

if said first transaction (T1) is an aborted transaction, and:
if the obsolete value is a new value (Vnou) of said variable, then the method consists erasing, from a descriptor (V1) of said variable, both an identity (T1) of the aborted transaction and an address (ADR1) of said memory location, and writing said address in a descriptor (T1) of said transaction, and then in releasing said hold (Hvn=0);

if the obsolete value was previously the current value of said variable, then the method consists of erasing, from the descriptor of said variable, both the identity (T1) of the aborted transaction and the address (ADR2) of said memory location, and in writing said address in the descriptor of said transaction, then releasing the hold (Hvc) assigned to the pointer, and then assigning a free memory location (ADR3) to the current value, writing said current value (Vcou) in said free memory location, and writing the address (ADR3) of said free memory location in the descriptor (DV1) of said variable;

if said first transaction (T1) is a transaction aborted because of a second transaction (T2) which needs to access said variable in order to write a new value (Vnou), and which validates said access, and if the obsolete value was previously the current value (Vcou) of the variable, then the method consists of exchanging, in the descriptor (DV1) of said variable, the addresses of the locations which respectively contain the obsolete current value (Vcou) and the new value (Vnou), and placing a hold (Hvn=1) on the location (ADR0) containing the obsolete value (Vcou), in order to prevent the obsolete value being modified, erasing the identity (T2) of the second transaction, and then releasing the hold (Hvn=0) assigned to the pointer for said new value (Vnou), if there is one.

* * * * *